United States Patent
Kupka

(10) Patent No.: US 9,750,224 B2
(45) Date of Patent: Sep. 5, 2017

(54) PET TRAINING APPARATUS AND WASTE RECEPTACLE

(71) Applicant: Todd Kupka, Mission Viejo, CA (US)

(72) Inventor: Todd Kupka, Mission Viejo, CA (US)

(*) Notice: Subject to any disclaimer, the term of this patent is extended or adjusted under 35 U.S.C. 154(b) by 551 days.

(21) Appl. No.: 14/246,845

(22) Filed: Apr. 7, 2014

(65) Prior Publication Data
US 2014/0299068 A1 Oct. 9, 2014

Related U.S. Application Data

(60) Provisional application No. 61/809,166, filed on Apr. 5, 2013.

(51) Int. Cl.
- *A01K 1/01* (2006.01)
- *A01K 1/035* (2006.01)
- *A01K 1/00* (2006.01)
- *A01K 1/03* (2006.01)

(52) U.S. Cl.
CPC ......... *A01K 1/0107* (2013.01); *A01K 1/035* (2013.01); *A01K 1/00* (2013.01); *A01K 1/03* (2013.01)

(58) Field of Classification Search
CPC ......... A01K 1/00; A01K 1/0035; A01K 1/01; A01K 1/0107; A01K 1/011; A01K 1/0125; A01K 1/015; A01K 1/0151; A01K 1/0157; A01K 1/0245; A01K 1/033; A01K 1/035
See application file for complete search history.

(56) References Cited

U.S. PATENT DOCUMENTS

| | | | | |
|---|---|---|---|---|
| 2,204,416 A | * | 6/1940 | Kramer | A01K 1/011 119/163 |
| 3,144,852 A | * | 8/1964 | Messeas | A01K 1/033 119/498 |
| 3,476,083 A | * | 11/1969 | Vander Wall | A01K 1/0107 119/166 |
| 3,726,255 A | * | 4/1973 | Marr | A01K 31/007 119/480 |
| 3,752,121 A | * | 8/1973 | Brazzell | A01K 1/0107 119/169 |
| 3,827,401 A | * | 8/1974 | Franzl | A01K 1/0107 119/169 |
| 4,023,531 A | * | 5/1977 | Thompson | A01K 1/035 119/458 |
| 4,319,545 A | * | 3/1982 | Sou | A01K 31/06 119/474 |

(Continued)

*Primary Examiner* — Monica Williams
*Assistant Examiner* — Michael A Fabula

(57) ABSTRACT

A pet training apparatus and waste receptacle that allows a pet to simulate urinating outdoors in an indoors environment. A base frame supports a grated cover on which a permeable sheet is positioned. As a pet urinates, the urine is passes through the permeable sheet and through a plurality of openings in the grated cover. The urine is then collected in a receptacle positioned below the base frame. The permeable sheet includes a plurality of synthetic fibers in order to give the appearance of natural grass. An enclosure can be attached to the base frame, such that the together the enclosure and base frame form a pet crate in which the pet can urinate. A bed can also be placed on the permeable sheet in order to differentiate a sanitary area for the pet to rest. A splash guard prevents urine from leaving the confines of the grated cover.

19 Claims, 16 Drawing Sheets

(56) References Cited

U.S. PATENT DOCUMENTS

| | | | | |
|---|---|---|---|---|
| 4,469,046 A * | 9/1984 | Yananton | A01K 1/0107 | 119/169 |
| 4,696,257 A * | 9/1987 | Neary | A01K 1/0114 | 119/166 |
| 4,972,800 A * | 11/1990 | Bennett | A01K 1/0107 | 119/166 |
| 5,092,270 A * | 3/1992 | Simons | A01K 1/0245 | 119/165 |
| 5,092,277 A * | 3/1992 | Baillie | A01K 1/0107 | 119/165 |
| 5,148,771 A * | 9/1992 | Schuett | A01K 1/01 | 119/479 |
| 5,355,837 A * | 10/1994 | Reyes | A01K 1/0107 | 119/161 |
| 5,361,725 A * | 11/1994 | Baillie | A01K 1/0107 | 119/161 |
| 5,482,007 A * | 1/1996 | Kumlin | A01K 1/0107 | 119/169 |
| 5,564,366 A * | 10/1996 | Hancock | A01K 1/0114 | 119/165 |
| 5,630,376 A * | 5/1997 | Ochi | A01K 1/0107 | 119/169 |
| 5,727,501 A * | 3/1998 | York | A01K 1/033 | 119/482 |
| 5,816,195 A * | 10/1998 | Flynn | A01K 1/0107 | 119/165 |
| 6,059,247 A * | 5/2000 | Olivadoti | A01K 1/0107 | 119/161 |
| 6,079,363 A * | 6/2000 | MacLaine | A01K 1/0107 | 119/161 |
| 6,408,790 B1 * | 6/2002 | Maguire | A01K 1/0114 | 119/165 |
| 6,523,495 B1 * | 2/2003 | Rydman | A01K 1/0107 | 119/167 |
| 6,578,520 B2 * | 6/2003 | Otsuji | A01K 1/0157 | 119/165 |
| 6,994,054 B2 * | 2/2006 | Matsuo | A01K 1/0114 | 119/166 |
| 7,096,823 B1 * | 8/2006 | Smeltzer | A01K 1/0114 | 119/161 |
| 7,107,933 B2 * | 9/2006 | Mohr | A01K 1/0107 | 119/166 |
| 7,114,464 B1 * | 10/2006 | Chang | A01K 1/011 | 119/161 |
| 7,584,717 B2 * | 9/2009 | Skovron | A01K 1/01 | 119/165 |
| 8,220,622 B1 * | 7/2012 | Lewis | A01K 1/0107 | 119/168 |
| D702,895 S * | 4/2014 | Mishan | D30/161 | |
| 8,863,693 B2 * | 10/2014 | Kennington | A01K 1/0114 | 119/161 |
| 8,887,667 B2 * | 11/2014 | Maguire | A01K 1/0107 | 119/165 |
| 9,107,382 B2 * | 8/2015 | Matsuo | A01K 1/0114 | |
| 2001/0013318 A1 * | 8/2001 | Kobayashi | A01K 1/0107 | 119/161 |
| 2001/0025910 A1 * | 10/2001 | Olivadoti | A01K 1/0107 | 248/346.01 |
| 2001/0054394 A1 * | 12/2001 | Marchioro | A01K 1/0245 | 119/452 |
| 2003/0150393 A1 * | 8/2003 | Otsuji | A01K 1/0157 | 119/169 |
| 2004/0011297 A1 * | 1/2004 | Hochman | A01K 1/0107 | 119/165 |
| 2004/0261727 A1 * | 12/2004 | Matsuo | A01K 1/0114 | 119/170 |
| 2005/0172908 A1 * | 8/2005 | Belgiorno | A01K 1/0107 | 119/166 |
| 2005/0279286 A1 * | 12/2005 | Youngmark | A01K 1/0353 | 119/28.5 |
| 2005/0284392 A1 * | 12/2005 | Hillman | A01K 1/011 | 119/169 |
| 2006/0037548 A1 * | 2/2006 | Mohr | A01K 1/0107 | 119/166 |
| 2006/0236949 A1 * | 10/2006 | Hill | A01K 1/0107 | 119/166 |
| 2006/0288948 A1 * | 12/2006 | Ikegami | A01K 1/0107 | 119/167 |
| 2007/0084413 A1 * | 4/2007 | Oertel | A01K 1/0107 | 119/165 |
| 2007/0089683 A1 * | 4/2007 | Roberts | A01K 1/03 | 119/477 |
| 2007/0107662 A1 * | 5/2007 | Queen | A01K 1/0353 | 119/28.5 |
| 2007/0113793 A1 * | 5/2007 | Kurahashi | A01K 1/0107 | 119/479 |
| 2007/0163508 A1 * | 7/2007 | Gloor | A01K 1/0114 | 119/166 |
| 2007/0169707 A1 * | 7/2007 | van Zuilekom | A01K 1/0107 | 119/169 |
| 2007/0283895 A1 * | 12/2007 | Skovron | A01K 1/0107 | 119/165 |
| 2008/0022714 A1 * | 1/2008 | Keller | A01K 1/0236 | 62/459 |
| 2008/0022941 A1 * | 1/2008 | Mankovitz | A01K 1/031 | 119/452 |
| 2008/0035069 A1 * | 2/2008 | Yamamoto | A01K 1/0114 | 119/169 |
| 2008/0072833 A1 * | 3/2008 | Meeks | A01K 1/0107 | 119/166 |
| 2008/0105207 A1 * | 5/2008 | Gloor | A01K 1/0114 | 119/161 |
| 2008/0105208 A1 * | 5/2008 | Hamrick | A01K 1/0107 | 119/165 |
| 2008/0178818 A1 * | 7/2008 | Aley | A01K 1/0107 | 119/165 |
| 2008/0245313 A1 * | 10/2008 | Jakubowski | A01K 1/0245 | 119/497 |
| 2008/0251026 A1 * | 10/2008 | Bell | A01K 1/0125 | 119/168 |
| 2009/0000556 A1 * | 1/2009 | Matsuo | A01K 1/0107 | 119/161 |
| 2009/0000558 A1 * | 1/2009 | Matsuo | A01K 1/0114 | 119/165 |
| 2009/0000559 A1 * | 1/2009 | Matsuo | A01K 1/0107 | 119/166 |
| 2009/0000560 A1 * | 1/2009 | Matsuo | A01K 1/0107 | 119/168 |
| 2009/0031964 A1 * | 2/2009 | Proxmire | A01K 1/033 | 119/484 |
| 2009/0038554 A1 * | 2/2009 | Tsutsumi | A01K 1/0107 | 119/166 |
| 2009/0044756 A1 * | 2/2009 | Otsuji | A01K 1/0152 | 119/169 |
| 2009/0126642 A1 * | 5/2009 | Coccia | A01K 1/0107 | 119/165 |
| 2009/0178622 A1 * | 7/2009 | Havluciyan | A01K 1/0107 | 119/161 |
| 2009/0288613 A1 * | 11/2009 | Ho | A01K 1/0245 | 119/482 |
| 2010/0050951 A1 * | 3/2010 | Maguire | A01K 1/0107 | 119/165 |
| 2010/0089336 A1 * | 4/2010 | Flannery | A01K 1/0245 | 119/498 |
| 2010/0122662 A1 * | 5/2010 | Kennington | A01K 1/0114 | 119/165 |
| 2010/0154716 A1 * | 6/2010 | Smith | A01K 1/0107 | 119/169 |
| 2010/0224133 A1 * | 9/2010 | Hiroshima | A01K 1/0107 | 119/169 |
| 2011/0067639 A1 * | 3/2011 | Bauer | A01K 1/0107 | 119/166 |
| 2011/0079971 A1 * | 4/2011 | Lulevitch | A01K 1/0245 | 280/28.12 |
| 2011/0146583 A1 * | 6/2011 | Larson | A01K 1/033 | 119/455 |
| 2011/0226190 A1 * | 9/2011 | Lamontagne | A01K 1/033 | 119/482 |

(56) References Cited

U.S. PATENT DOCUMENTS

| | | | |
|---|---|---|---|
| 2012/0000428 A1* | 1/2012 | Keating | A01K 1/015 119/28.5 |
| 2012/0006274 A1* | 1/2012 | Feld | A01K 1/0107 119/168 |
| 2012/0118241 A1* | 5/2012 | Smith, II | A01K 1/0107 119/167 |
| 2012/0210947 A1* | 8/2012 | DiPaolo | A01K 15/02 119/472 |
| 2012/0312242 A1* | 12/2012 | Hillman | A01K 1/0125 119/169 |
| 2013/0092092 A1* | 4/2013 | Matsuo | A01K 1/0107 119/169 |
| 2013/0098300 A1* | 4/2013 | Matsuo | A01K 1/0107 119/166 |
| 2013/0098301 A1* | 4/2013 | Matsuo | A01K 1/0107 119/169 |
| 2013/0171597 A1* | 7/2013 | Kong | G09B 19/0076 434/247 |
| 2013/0213311 A1* | 8/2013 | Matsuo | A01K 1/0114 119/169 |
| 2013/0298840 A1* | 11/2013 | Mishan | A01K 1/0107 119/165 |
| 2014/0150727 A1* | 6/2014 | Matsuo | A01K 1/0114 119/169 |
| 2014/0158060 A1* | 6/2014 | Martin | A01K 1/0107 119/169 |
| 2014/0196666 A1* | 7/2014 | Kuzniar | A01K 1/0157 119/479 |
| 2014/0251224 A1* | 9/2014 | Yamamoto | A01K 1/0114 119/165 |
| 2015/0020743 A1* | 1/2015 | Bauer | A01K 1/0114 119/166 |
| 2015/0047570 A1* | 2/2015 | Abe | A01K 1/0107 119/168 |
| 2015/0048538 A1* | 2/2015 | Sogou | A01K 1/0155 264/128 |
| 2015/0075439 A1* | 3/2015 | Sogou | A01K 1/0107 119/166 |

* cited by examiner

PET TRAINING APPARATUS AND WASTE RECEPTACLE

The current application claims a priority to the U.S. Provisional Patent application Ser. No. 61/809,166 filed on Apr. 5, 2013. The current application is filed on Apr. 7, 2014 while Apr. 5, 2014 was on a weekend.

FIELD OF THE INVENTION

The present invention relates generally to a training apparatus and a waste receptacle. More specifically, the present invention is a waste receptacle for pets that closely simulates the experience of urinating outdoors onto natural grass. The present invention may be used indoors and outdoors as well as with a variety of accessories such as liners, pads, and litter.

BACKGROUND OF THE INVENTION

Domestic animals such as dogs are expected to relieve themselves outdoors and are trained accordingly. Dogs that are not fully accustomed to relieving themselves outdoors are prone to causing accidents indoors during the training process, especially when left alone in a crate for an extended period of time. When a dog is left in a crate for an extended period of time, the dog has nowhere to relieve itself. Not allowing the dog to void itself can be very stressful on the dog and lead to training or association issues later in time. Additionally, if the dog can no longer hold it and voids within the crate, it creates a mess for the owner and may reinforce the idea of repeating the action.

Taking their dogs outdoors can often be inconvenient or not possible for dog owners. A typical solution is the use of waste receptacles that can be used both indoors and outdoors. However, these waste receptacles are often costly and it is difficult to coerce a dog to urinate normally as on natural grass outdoors. Additionally, these waste receptacles are typically standalone, open devices. Therefore, the owner must purchase multiple devices to accommodate the dog.

Furthermore, issues still arise when allowing a dog to urinate outdoors. Mainly the act of urinating on the lawn, especially repeatedly in one spot, can lead to the burn out of grass, resulting in unsightly brown patches in the lawn. This can detract from the overall appearance of the residence, particularly if the lawn is not fenced in. The present invention seeks to address the previously discussed issues and improve upon the existing prior art.

The present invention provides an elevated waste receptacle that closely simulates for a dog the experience of urinating outdoors onto natural grass. In its preferred embodiment, the present invention comprises a base frame onto which a grated cover is seated. A flat bottomed receptacle is slotted into the space between the base frame and the surface on which the base frame is resting. A layer of artificial turf is seated on top of the grated cover and covers all of the openings present on the surface of the grated cover. The grated cover is composed of a low cost and durable material that is able to support the weight of a dog seated upon the grated cover. In the preferred embodiment of the present invention, the artificial turf physically resembles natural grass in order to coerce dogs to urinate upon the artificial turf. In this way, the dog is taught from day one to associate grass with the proper area to go to bathroom. The artificial turf is treated with an incentive such as the scent of natural grass and dirt in order to assist a dog's adjustment to using the present invention.

The elevated waste receptacle of the present invention may be utilized as an enclosure for a dog as well. In this way, the present invention eliminates the need for an owner to purchase both a crate and waste receptacle. The base frame of the present invention is capable of accommodating a deployable fence that converts the waste receptacle into a dog enclosure. In the dog enclosure configuration, a user may place bedding material over a portion of the layer of artificial turf. This allows a dog to rest, sleep, and relieve itself within the enclosure. The fence may be removed to convert the dog enclosure back into a waste receptacle.

A dog is able to urinate into the receptacle of the present invention. The material of the artificial turf is permeable and porous to allow urine to drain through the artificial turf and the grated cover and into the receptacle. The present invention provides a means for dogs to relieve themselves both indoors and outdoors. Accordingly, the present invention is particularly useful during the training process for dogs that are not yet fully accustomed to urinating outdoors. Accessories such as liners, pads, and litter may be used with the present invention. These accessories are placed into the flat bottomed receptacle prior to use of the present invention. The elevated structure of the base frame allows convenient removal of the receptacle during cleaning and replacement of the liners, pads, or litter within.

DETAIL DESCRIPTIONS OF THE INVENTION

Figure 1:
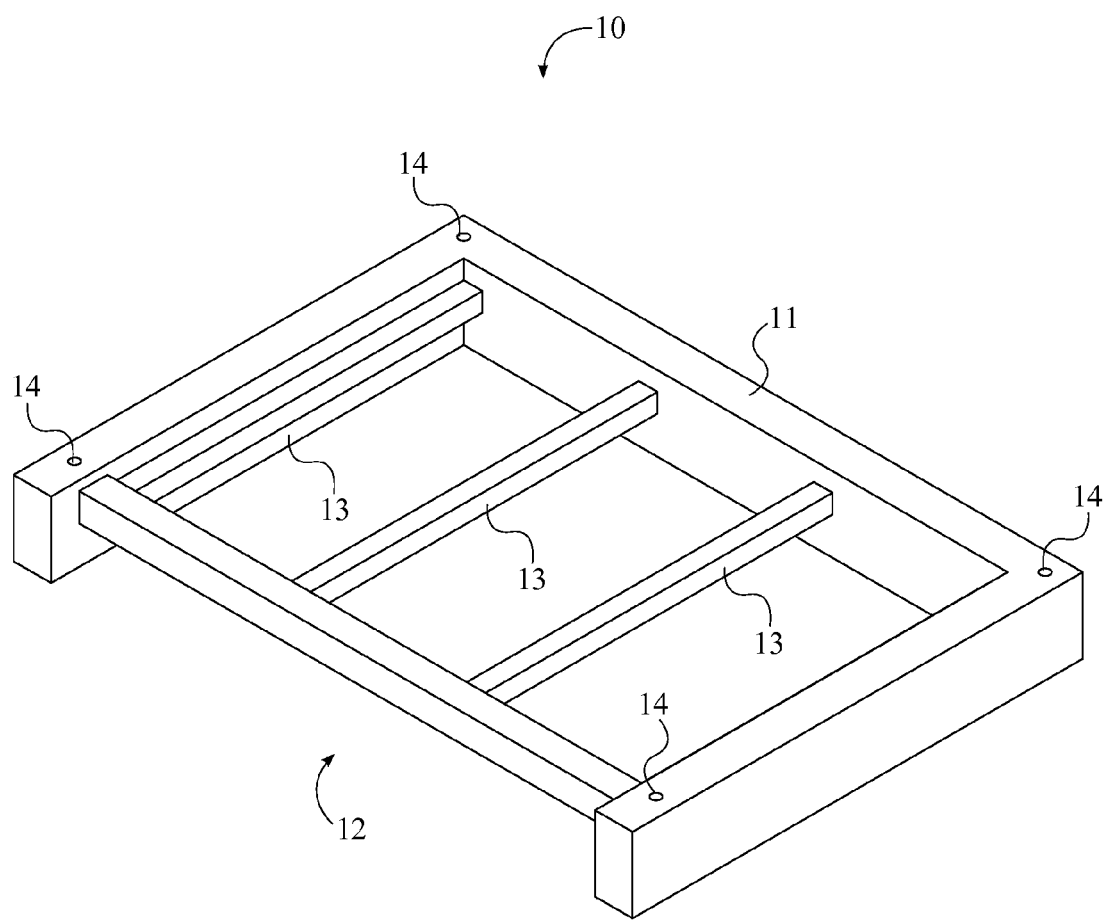
FIG. 1 is a perspective view of the base frame.

All illustrations of the drawings are for the purpose of describing selected versions of the present invention and are not intended to limit the scope of the present invention.

The present invention is a pet training apparatus and waste receptacle 20 that allows a pet to simulate the experience of urinating outdoors in virtually any environment. The pet training apparatus and waste receptacle 20 comprises a base frame 10, a receptacle 20, a grated cover 30, a permeable sheet 40, and an enclosure 50. The enclosure 50 is detachable from the base frame 10 and allows the present invention to be converted between a standalone waste receptacle and a traditional pet crate. The preferred embodiment of the present invention is discussed with respect to components forming an apparatus that is rectangular in shape; however, it is understood that the present invention may form any other shaped apparatus. The use of the present invention is hereinafter described in reference to use with dogs, however, it is possible for the present invention to be adapted for use with various other pets.

Figure 2:
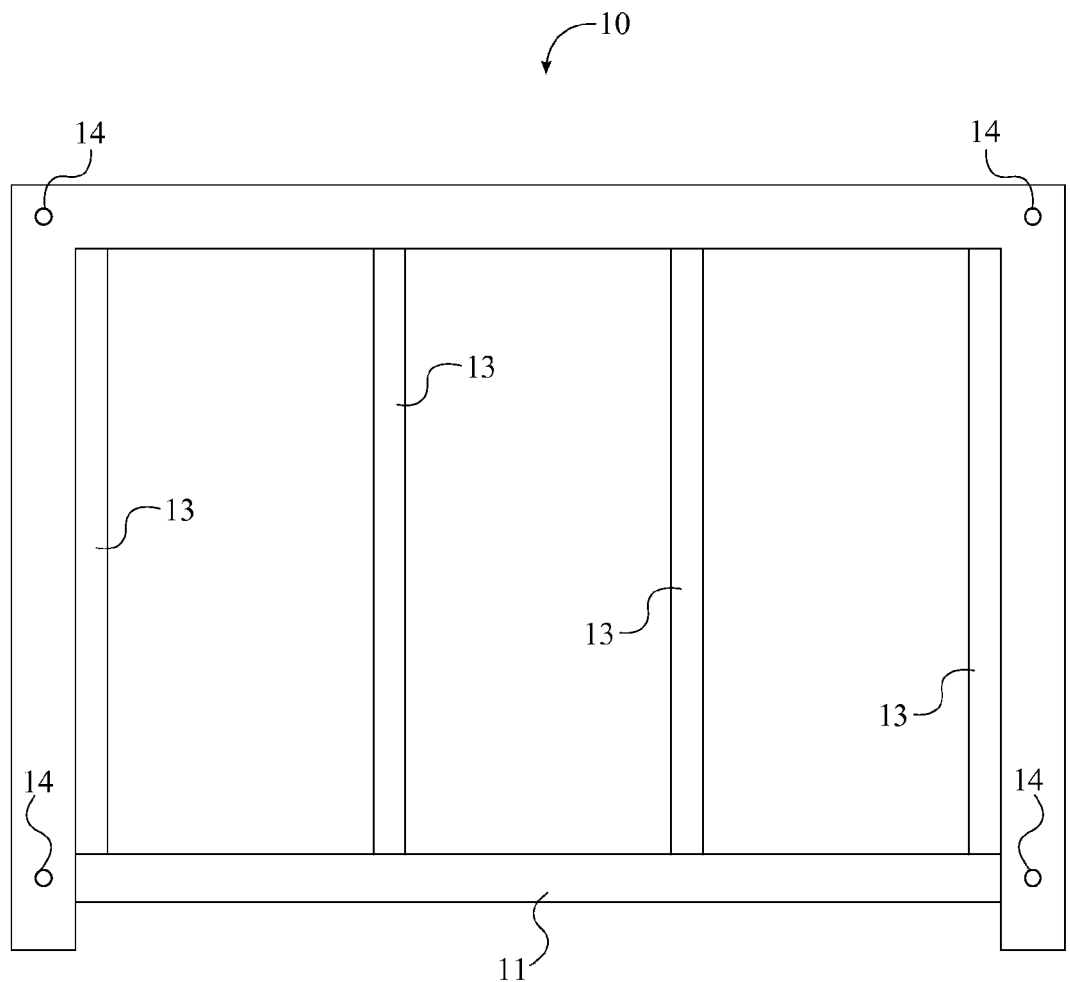
FIG. 2 is a top plan view of the base frame.
Figure 3:
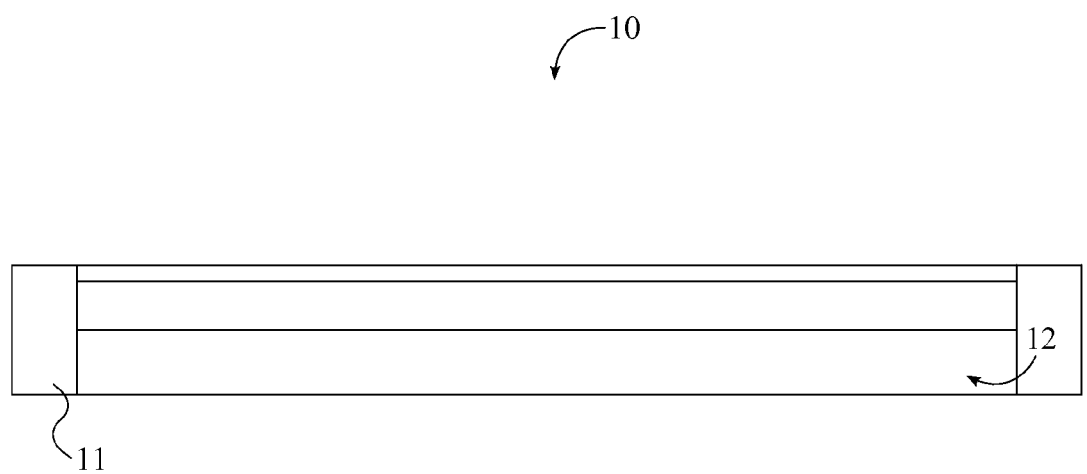
FIG. 3 is a front elevational view of the base frame.

In reference to FIG. 1-3, the base frame 10 comprises a lateral base wall 11, a base opening 12, and a plurality of cross members 13. The present invention is not limited with respect to material of the base frame 10. Example materials include, but are not limited to polyvinyl chloride (PVC), polypropylene, plastic, aluminum, and stainless steel. The base opening 12 traverses through the lateral base wall 11 in order to provide access to the receptacle 20 when the present invention is assembled. In the preferred embodiment of the present invention, the lateral base wall 11 is rectangular in shape and the base opening 12 traverses through a single side of the lateral base wall 11, wherein the single side has a smaller cross-section than that of the remaining sides.

In reference to FIG. 2, the plurality of cross members 13 is positioned within the lateral base wall 11 and each of the plurality of cross members 13 is adjacently connected to the lateral base wall 11. In the preferred embodiment of the present invention, each of the plurality of cross members 13 is equally spaced along the width of the lateral base wall 11; however, the plurality of cross members 13 may be positioned in any other way. The plurality of cross members 13 is positioned below the top surface of the lateral base wall 11, such that a seat is formed within the base frame 10 for receiving the grated cover 30. The base frame 10 is intended for use on a flat surface. Accordingly, each of the plurality of cross members 13 is raised above the bottom surface of the lateral base wall 11, such that there is sufficient clearance between the plurality of cross members 13 and the surface on which the base frame 10 is resting in order to provide clearance for the receptacle 20.

In alternative embodiments of the present invention, the base frame 10 may feature various structures and/or designs that differ from the base frame 10 of the preferred embodiment previously discussed. Additionally, the plurality of cross members 13 of the base frame 10 may be reinforced to further support weight during use of the present invention. For example, each of the plurality of cross members 13 may be reinforced with internal steel bars for increased reliability. The base frame 10 and the present invention as a whole are not limited with respect to size. Features such as the exact number of the plurality of cross members 13 of the base frame 10 may vary according to the respective sizes of the present invention.

Figure 5:
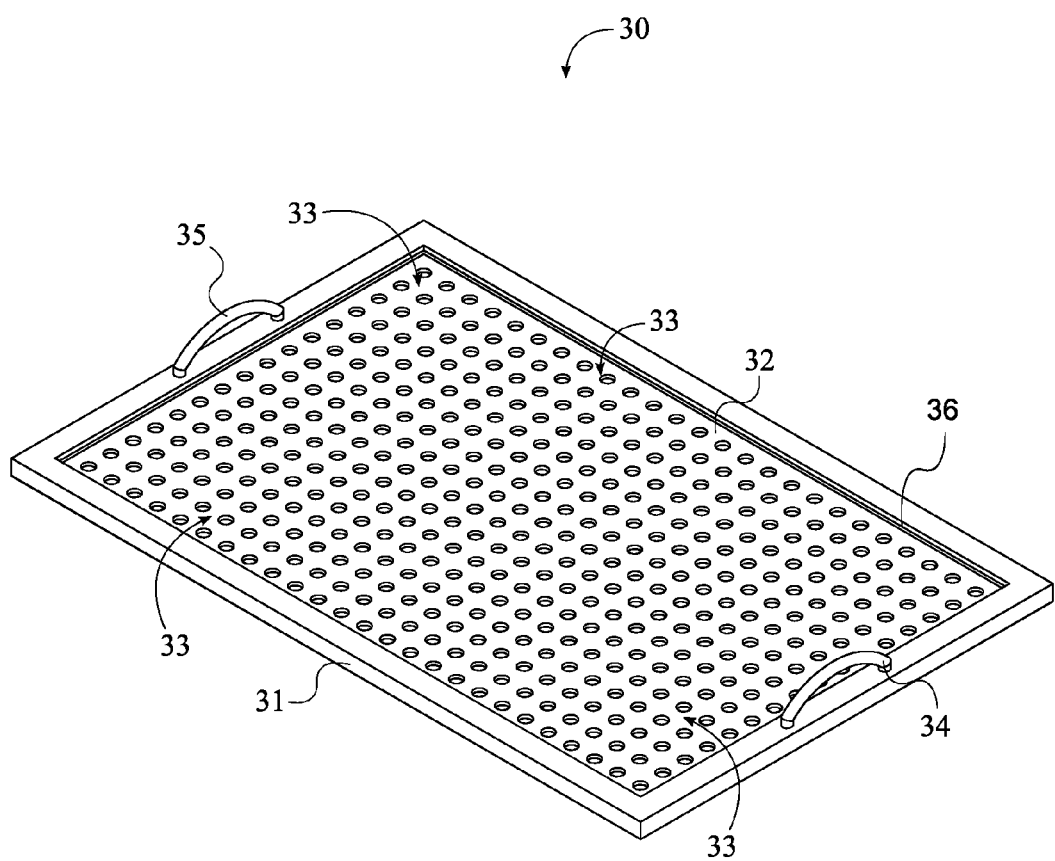
FIG. 5 is a perspective view of the grated cover.
Figure 6:
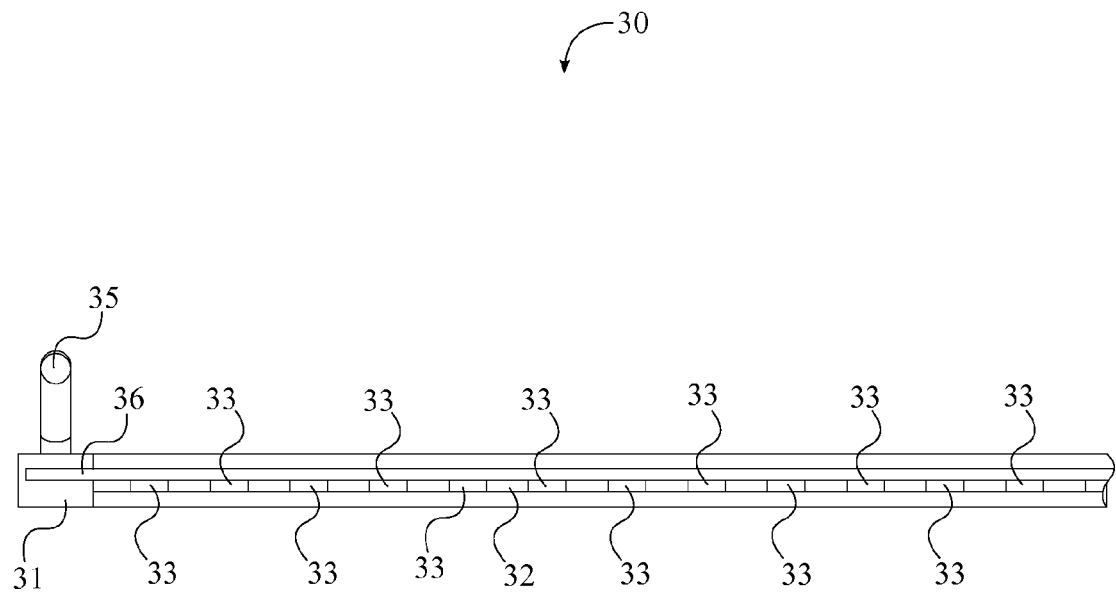
FIG. 6 is a front sectional view of the grated cover.

In reference to FIG. 5-6, the grated cover 30 comprises a lateral cover wall 31, a cover panel 32, a plurality of openings 33, a lateral inner groove 36, a first cover handle 34, and a second cover handle 35. The grated cover 30 is manufactured from a material that is lightweight, yet capable of supporting the weight of a dog, such that the grated cover 30 will not deform. Furthermore, the material is capable of maintaining durability while remaining low cost. As with the base frame 10, example materials include, but are not limited to, PVC, polypropylene, plastic, aluminum, and stainless steel. In the preferred embodiment of the present invention, the grated cover 30 is rectangular in shape.

In further reference to FIG. 5, the lateral cover wall 31 serves as a support frame within which the cover panel 32 is positioned. As such, the cover panel 32 is perimetrically connected to the lateral cover wall 31. The plurality of openings 33 traverses through the cover panel 32, wherein the plurality of openings 33 is distributed about the cover panel 32. Both the first cover handle 34 and the second cover handle 35 are adjacently connected to the lateral cover wall 31. Additionally, the first cover handle 34 and the second cover handle 35 are positioned opposite each other along the grated cover 30, wherein the plurality of openings 33 is positioned in between the first cover handle 34 and the second cover handle 35.

Figure 13:
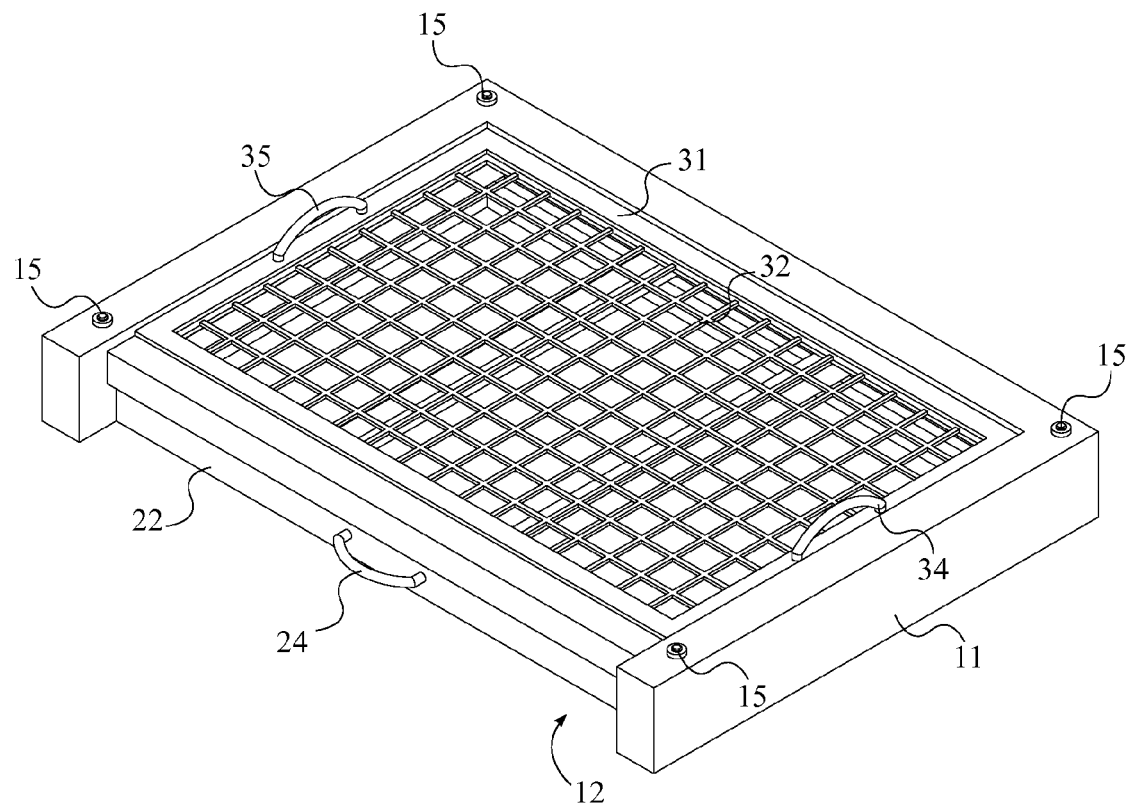
FIG. 13 is a perspective view of the grated cover, wherein the plurality of openings is alternatively shaped.

In the preferred embodiment of the present invention, each of the plurality of openings 33 is circular in shape and is sized such that liquid may drain through the circular holes of the grated cover 30. However, it is possible for the plurality of openings 33 to be any other shape, as shown in FIG. 13, so long as each of the plurality of openings 33 is of sufficient size as to allow ample liquid to drain through. In reference to FIG. 9, when the present invention is assembled, the grated cover 30 is positioned onto the plurality of cross members 13, within the lateral base wall 11, wherein the plurality of openings 33 is positioned adjacent to the plurality of cross members 13. Additionally, the first cover handle 34 and the second cover handle 35 are positioned on the lateral cover wall 31 opposite the plurality of cross members 13, such that the grated cover 30 can readily be lifted from the seat of the base frame 10.

In reference to FIG. 6, the lateral inner groove 36 is positioned into the lateral cover wall 31. The lateral inner groove 36 is positioned adjacent to the cover panel 32. Additionally, the lateral groove is positioned about the cover panel 32 opposite the plurality of cross members 13 when the grated cover 30 is positioned into the seat of the base frame 10. The lateral inner groove 36 acts to retain the position of components placed on top of the cover panel 32, such that said components do not inadvertently shift, detach, etc. from the grated cover 30.

Figure 4:
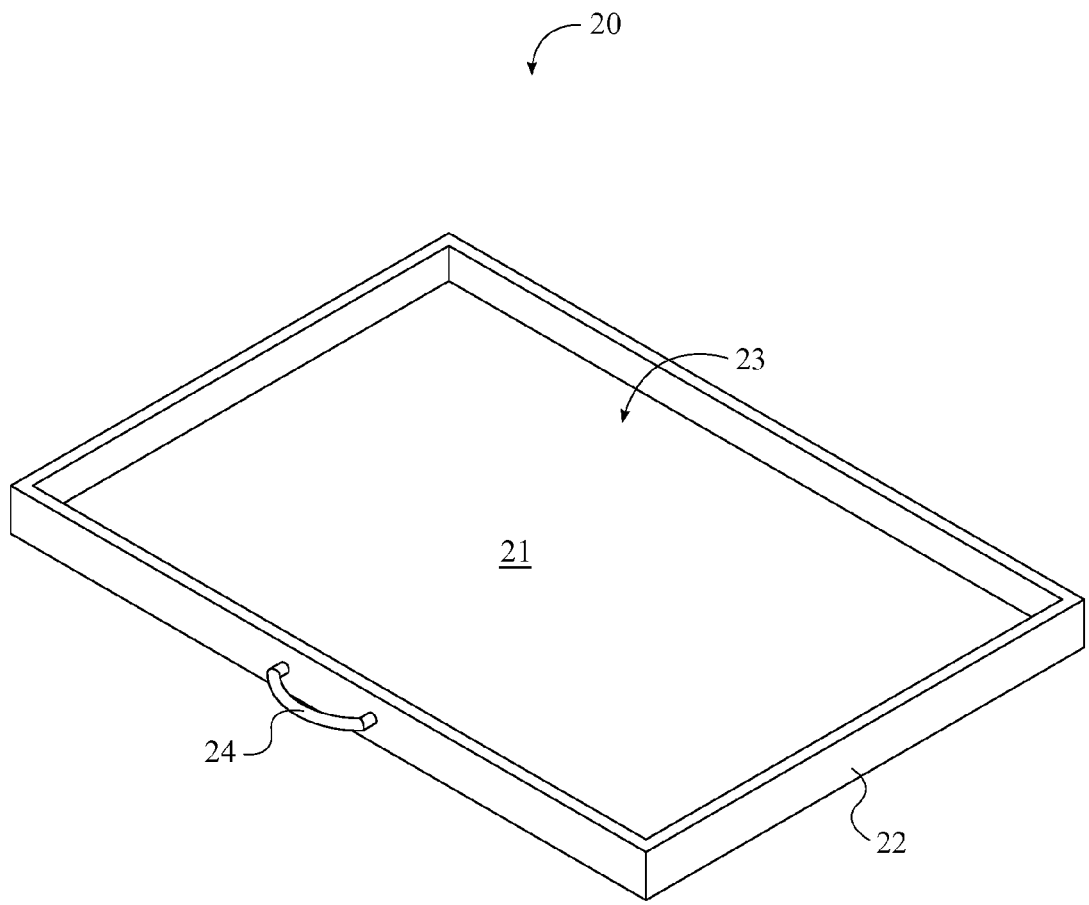
FIG. 4 is a perspective view of the receptacle.

In reference to FIG. 4, the receptacle 20 comprises a bottom panel 21, a lateral receptacle wall 22, a receiving volume 23, and a receptacle handle 24. The lateral receptacle wall 22 is perimetrically connected to the bottom panel 21, and together the bottom panel 21 and the lateral receptacle wall 22 delineate the receiving volume 23. The bottom panel 21 is flat to allow the receptacle 20 to rest on a flat surface during use, while the open top of the receptacle 20 allows access to the receiving volume 23 from above. The receptacle 20 is sized such that the receptacle 20 may be positioned within the lateral base wall 11, adjacent to the plurality of cross members 13 opposite the grated cover 30. In this way, the receptacle 20 is positioned between the plurality of cross members 13 and the flat surface on which the present invention is positioned while in use.

Figure 9:
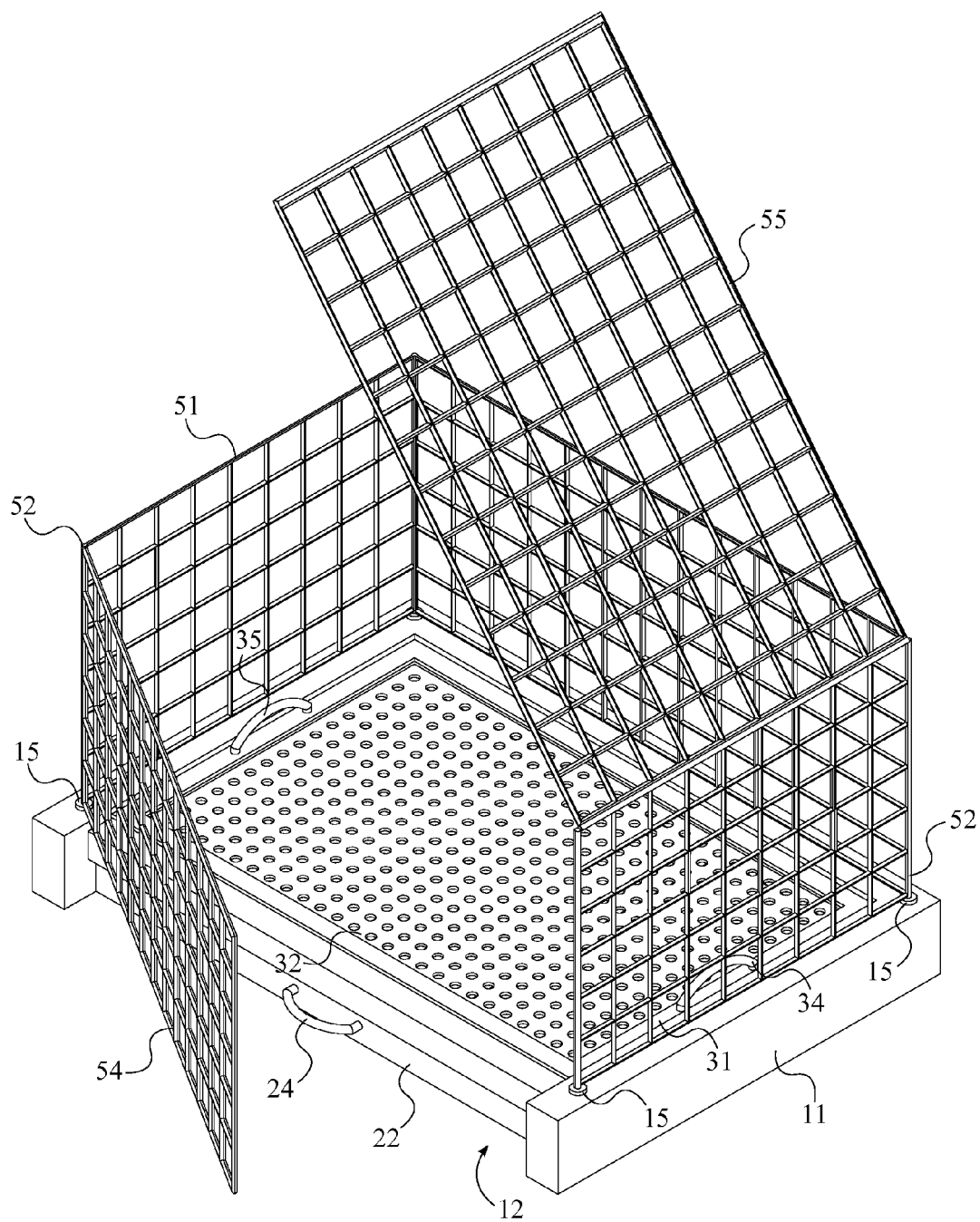
FIG. 9 is a perspective view of the assembly of the base frame, receptacle, grated cover, and enclosure.
Figure 10:
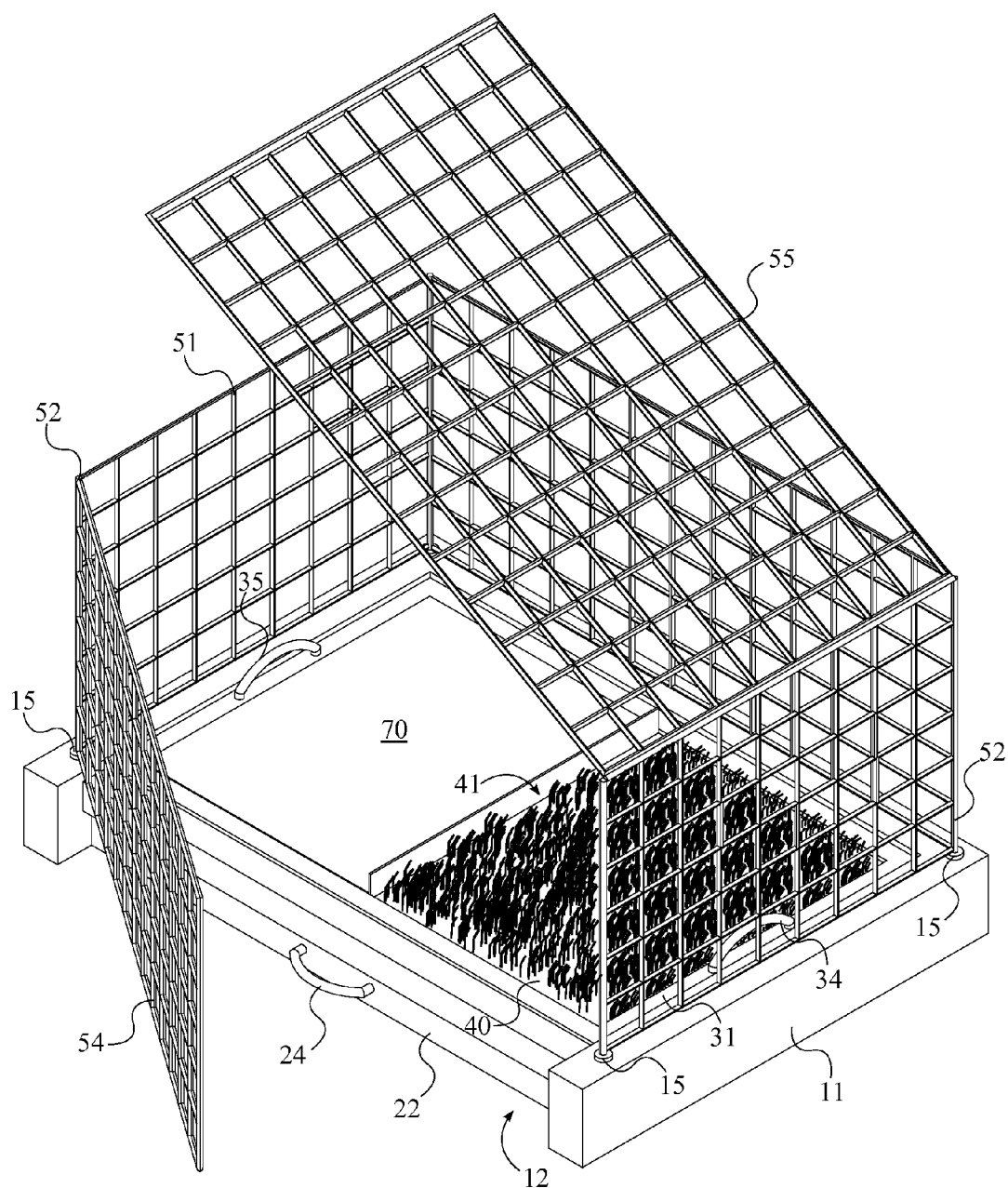
FIG. 10 is a perspective view thereof further including the permeable sheet and bed.

In reference to FIG. 9, the base opening 12 is positioned adjacent to the receptacle 20, such that the receptacle 20 can be removed from the base frame 10. The receptacle handle 24 is adjacently connected to the lateral receptacle wall 22 and positioned adjacent to the base opening 12, such that the receptacle handle 24 is readily accessible to remove the receptacle 20. Alternative embodiments of the present invention may feature the receptacle 20 of a different shape than that of the preferred embodiment previously discussed.

In further reference to FIG. 9, in the preferred embodiment of the present invention, the base frame 10, the receptacle 20, and the grated cover 30 are designed and sized in a manner such that the three components may be assembled together. The grated cover 30 is slotted into the rectangular seat of the base frame 10. The receptacle 20 is slid into the clearance formed by the lateral base wall 11, the plurality of cross members 13, the base opening 12, and the flat surface on which the base frame 10 is resting. The grated cover 30 is removable from the base frame 10 by the first cover handle 34 and the second cover handle 35, while the receptacle 20 is removable from the base from by the receptacle handle 24.

Figure 7:
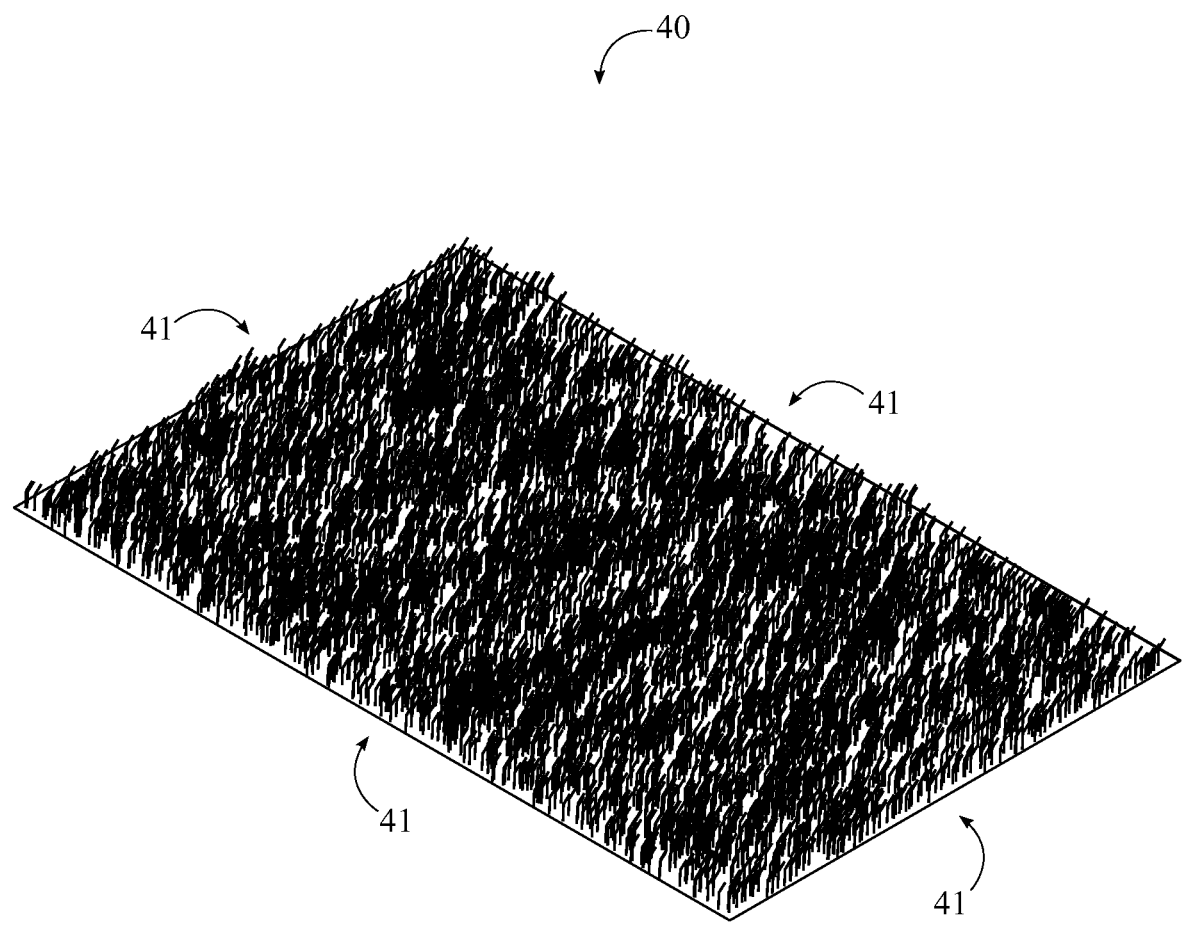
FIG. 7 is a perspective view of the permeable sheet.
Figure 11:
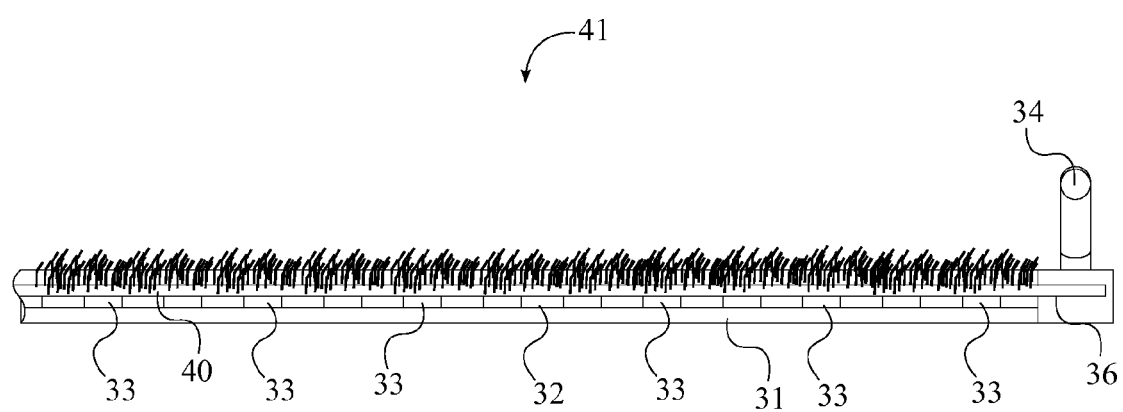
FIG. 11 is a front sectional view of the permeable sheet positioned into the lateral inner groove.

In reference to FIG. 7, in the preferred embodiment of the present invention, the permeable sheet 40 is a flexible, rubberized sheet of material that is rectangular in shape. The material is porous and permeable to allow liquids to drain through one side of the permeable sheet 40 to the other side of the permeable sheet 40. The permeable sheet 40 is sized in a manner such that the permeable sheet 40 completely covers the plurality of openings 33 when positioned onto the grated cover 30. Additionally, the permeable sheet 40 is positioned into the lateral inner groove 36 of the grated cover 30, as shown in FIG. 11. In this way, the permeable sheet 40 is securely attached to the grated cover 30, such that the permeable sheet 40 will not inadvertently be displaced by the movement of a dog when the present invention is used by said dog.

In further reference to FIG. 7, the permeable sheet 40 comprises a plurality of synthetic fibers 41. The plurality of synthetic fibers 41 forms an artificial turf that replicates natural grass and is positioned on the permeable sheet 40 opposite the plurality of openings 33 of the grated cover 30. In the preferred embodiment of the present invention, the plurality of synthetic fibers 41 physically resembles natural green grass; however, it is possible for the plurality of fibers to be any other color. Alternative embodiments of the present invention may feature a type or design of the permeable sheet 40 that differs from that of the preferred embodiment previously discussed. The plurality of openings 33 of the grated cover 30 allows sufficient drainage of liquid, thus allowing the permeable sheet 40 to dry.

It is understandable that dogs may not be prone to urinating on the permeable sheet 40 despite the close resemblance of the permeable sheet 40 to natural grass due to the plurality of synthetic fibers 41. As such, the plurality of synthetic fibers 41 is scented in order to further simulate natural grass and thus further incentivize the dog to urinate on the permeable sheet 40. The plurality of synthetic fibers 41 can be scented by treating the plurality of synthetic fibers 41 with non-toxic chemicals or natural products. An example of a possible scent is that of natural grass and dirt. Additionally, scent packages may be provided in order to reapply the desired scent or to apply a new scent.

Figure 8:
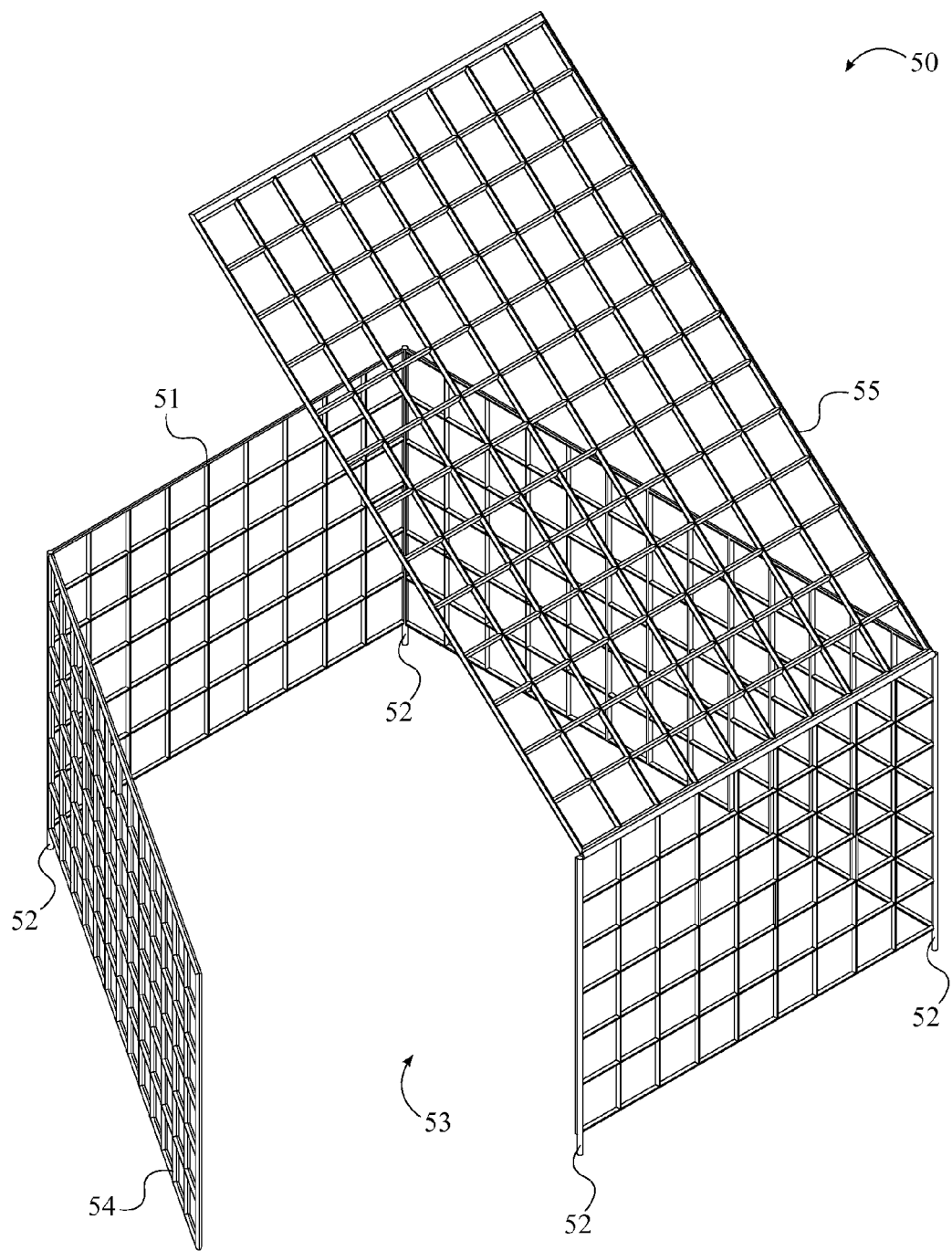
FIG. 8 is a perspective view of the enclosure.

In reference to FIG. 8-9, the enclosure 50 may be attached to the base frame 10 in order to convert the present invention from a standalone waste receptacle 20 into a dog enclosure 50. The enclosure 50 comprises a lateral enclosure wall 51 and a top enclosure wall 55. The lateral enclosure wall 51 is attached to the lateral base wall 11 of the base frame 10 opposite the receptacle 20 and is positioned around the plurality of cross members 13. The top enclosure wall 55 is hingedly connected to the lateral enclosure wall 51, such that the enclosure 50 can be opened and closed in order to access the permeable sheet 40 and grated cover 30 from above when the enclosure 50 is attached to the base frame 10. Example materials for constructing the lateral enclosure wall 51 and the top enclosure wall 55 include, but are not limited to, mesh netting, metal, and plastic. A top enclosure lock is also operatively coupled to the lateral enclosure wall 51 and the top enclosure wall 55 in order to secure the top enclosure wall 55 in a closed position.

In the preferred embodiment of the present invention, the top enclosure lock comprises a first strap lock and a second strap lock. The first strap lock and the second strap lock are positioned on the same side of the top enclosure wall 55 and positioned opposite each other along the top enclosure wall 55. The first strap lock and the second strap lock are operatively coupled to the top enclosure wall 55 and the lateral enclosure wall 51 in order to secure the top enclosure wall 55 closed. Both the first strap lock and the second strap lock comprise a buckle or similar fastening member to secure the two ends of the first strap lock together and the two ends of the second strap lock together. The buckle offers a quick release mechanism in order to readily open the top enclosure wall 55.

In further reference to FIG. 8, in addition to the hinged connection of the top enclosure wall 55, the lateral enclosure wall 51 comprises an enclosure opening 53 and a door 54 for further accessing the permeable sheet 40 and the grated cover 30. The enclosure opening 53 may span an entire side of the lateral enclosure wall 51 or only a portion of one of the sides of the lateral enclosure wall 51, while the door 54 is positioned adjacent to the enclosure opening 53. The door 54 is hinged, such that the door 54 can be opened and closed in order to provide access to the permeable sheet 40 and the grated cover 30 through the side of the enclosure 50. A lateral enclosure lock is operatively coupled to the lateral enclosure wall 51 and the door 54 in order to secure the door 54 in a closed position.

Figure 12:
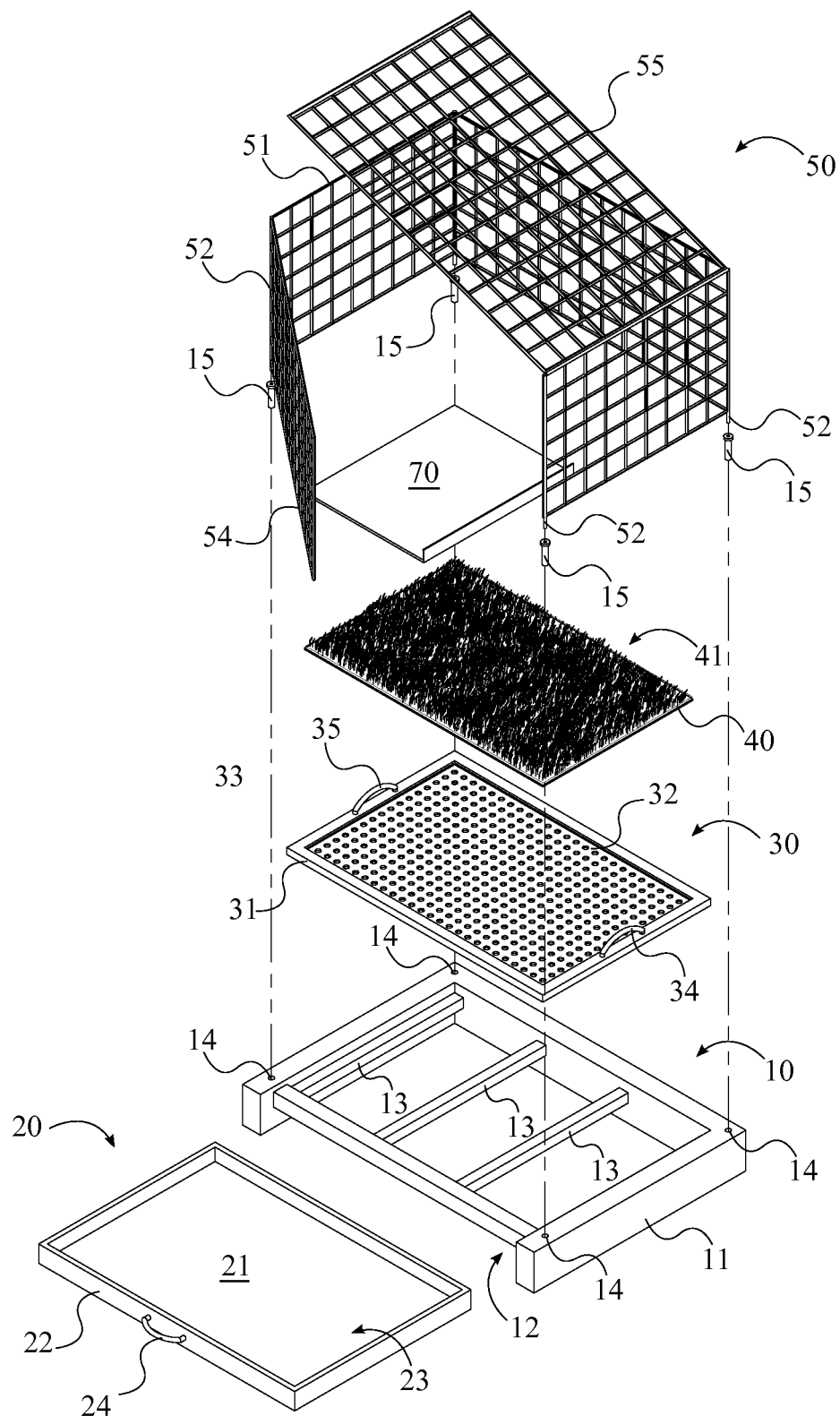
FIG. 12 is an exploded view of the present invention.

In reference to FIG. 12, the lateral enclosure wall 51 further comprises a plurality of posts 52 and the base frame 10 further comprises a plurality of holes 14 and a plurality of clamps 15. The plurality of holes 14 is positioned around the plurality of cross members 13 and into the lateral base wall 11 opposite the receptacle 20. The plurality of clamps 15 is screwed into the plurality of holes 14 and provides a means of attachment for the plurality of posts 52 when the plurality of posts 52 is positioned into the plurality of holes 14. The plurality of posts 52 is securely held in place by the plurality of clamps 15, thus ensuring the structural stability of the lateral enclosure wall 51.

In the preferred embodiment of the present invention, the lateral enclosure wall 51 has a rear wall, a left wall, and a right wall. The left wall and the right wall are identical in size and positioned opposite each other about the rear wall. The left wall and the right wall are secured to the rear wall by means of the plurality of posts 52. The enclosure opening 53 is positioned from the left wall to the right wall opposite the rear wall, wherein the door 54 is hingedly connected to either the left wall or the right wall and acts as the fourth wall when closed. Alternative embodiments of the present invention may feature a smaller sized dog door on the door 54. The enclosure 50 is not limited with respect to material or design. For example, the enclosure 50 can be made out of metal or plastic, in the style of a traditional dog crate, or the top enclosure wall 55 and the walls of the lateral enclosure wall 51 can be made of mesh or netting, while the plurality of posts 52 is constructed from a rigid material.

When the present invention is in use, the grated cover 30 is slotted into the rectangular seat of the base frame 10, while the receptacle 20 is positioned below the grated cover 30 and the plurality of cross members 13. The permeable sheet 40 is placed onto the grated cover 30 in a manner such that each of the plurality of openings 33 is fully covered and the edges of the permeable sheet 40 are tucked into the lateral inner groove 36 of the grated cover 30. As a dog urinates on the permeable sheet 40, the urine passes through the permeable sheet 40 and through the plurality of openings 33 of the grated cover 30, and is then collected in the receptacle 20. In order to increase the sanitation of the receptacle 20 and the ease of removing waste from the receptacle 20, a variety of accessories may be used with the present invention, which allow for the easy removal of waste. Such accessories may include, but are not limited to, liners, pads, and litter. The accessories are placed in and distributed evenly within the receiving volume 23 along the bottom panel 21 of the receptacle 20, and optionally along the lateral receptacle wall 22. The receptacle 20 is readily removed for cleaning or replacing liners, pads, litter, etc. by the receptacle handle 24. Similarly, the grated cover 30 is readily removed for cleaning by the first cover handle 34 and the second cover handle 35.

If the enclosure 50 is desired, then each of the plurality of posts 52 of the lateral enclosure wall 51 is slotted into the plurality of openings 33 present about the top surface of the lateral base wall 11 of the base frame 10. The present invention may further comprises a bed 70 for use in the enclosed configuration. The bed 70 is positioned onto the plurality of synthetic fibers 41 and covers only a portion of the permeable sheet 40. Additionally, the bed 70 comprises a vertical lip that acts to further distinguish the bed 70 from the permeable sheet 40 and prevents any bedding placed on top of the bed 70 from slipping onto the permeable sheet 40. In this way, the dog has a clean area on which to rest, while a portion of the permeable sheet 40 is still accessible for the dog to urinate or defecate on. Thus, the enclosure 50 prevents the dog from running rampant within a home while providing the dog with a means of relieving itself indoors.

The bed 70 is securely attached to the lateral cover wall 31, such that the bed 70 does not shift when the dog moves around within the present invention. In the preferred embodiment of the present invention, a plurality of hook and loop fasteners is used to securely attach the bed 70 to the lateral cover wall 31. The plurality of hook and loop fasteners is connected to a bottom surface of the bed 70 and the top surface of the lateral cover wall 31. In this way, the plurality of hook and loop fasteners of the bed 70 engages the plurality of hook and loop fasteners of the lateral cover wall 31, thus securing the bed 70 to the lateral cover wall 31. Furthermore, the plurality of hook and loop fasteners is waterproof.

Alternatively, a plurality of turn locks can be used to secure the bed 70 to the lateral cover wall 31. Each of the plurality of turn locks is positioned through the bed 70 and into the lateral cover wall 31, wherein the bed 70 is coupled to the lateral cover wall 31. Each of the plurality of turn locks can then be rotated, such that each of the plurality of turn locks engages the lateral cover wall 31 in order to secure the bed 70 to the lateral cover wall 31. Furthermore, the plurality of turn locks may traverse into the lateral inner groove 36 and engage the lateral inner groove 36. In another alternative embodiment, the bed 70 may be secured to the lateral enclosure wall 51 using a plurality of fasteners, wherein the plurality of fasteners can be ties, clamps, clips, etc. It is also possible for the bed 70 to be attached to the lateral cover wall 31 in any other manner.

Figure 14:
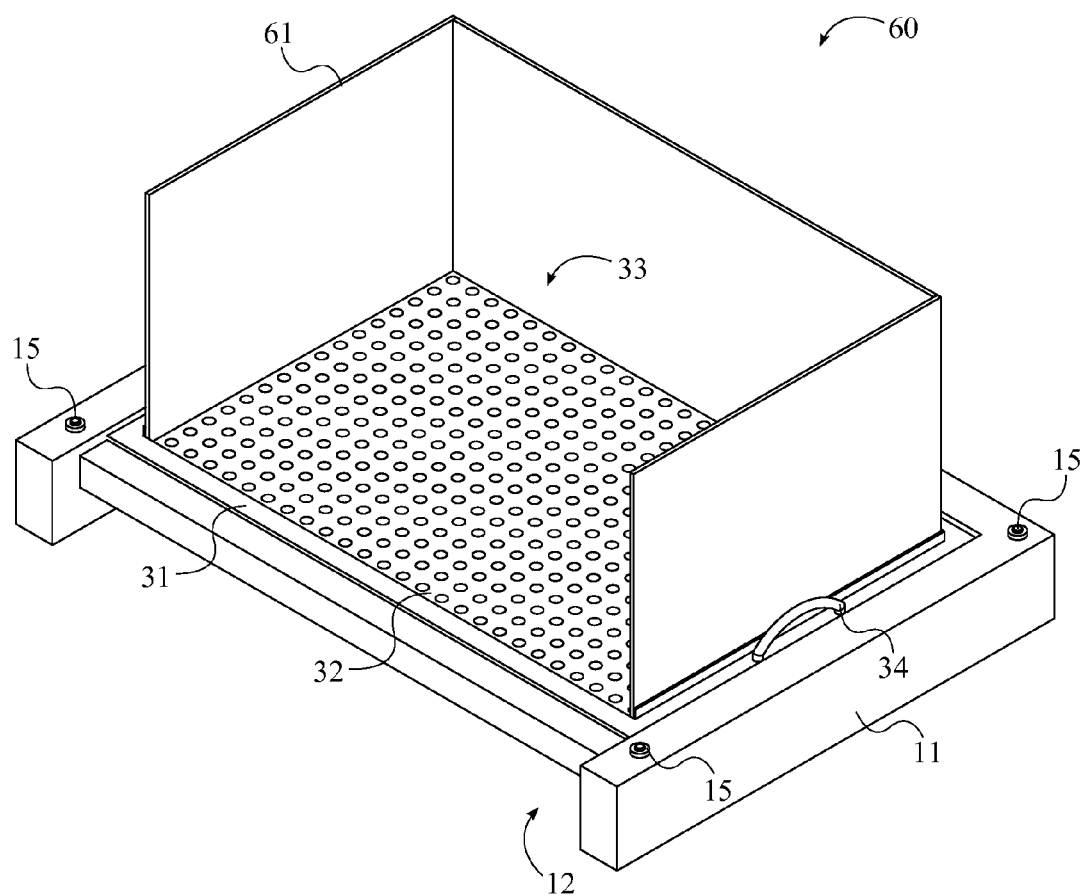
FIG. 14 is perspective view of the splash guard positioned onto the grated cover.
Figure 15:
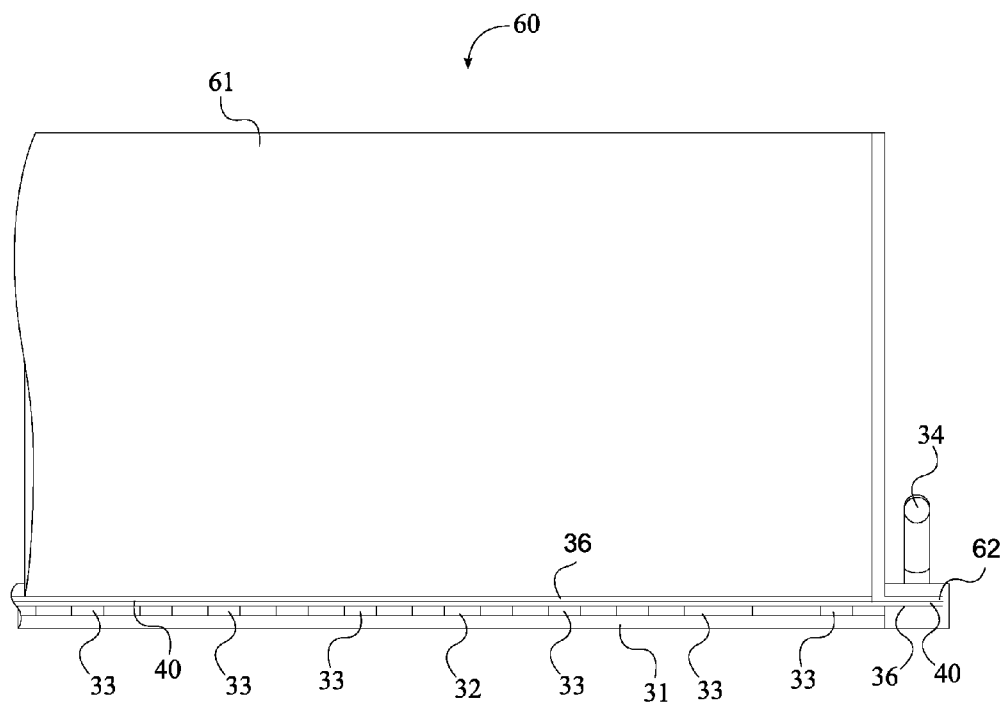
FIG. 15 is a front sectional view showing the lip of the splash guard positioned into the lateral inner groove.

A potential issue that may arise during normal use of the present invention is the splashing or spraying of urine. Male dogs that are accustomed to lifting their hind legs while urinating naturally, may inadvertently splash or spray urine outside of the confines of the permeable sheet 40 and the grated cover 30. In order to remedy this issue, the present invention may further comprise a splash guard 60. In reference to FIG. 14-15, the splash guard 60 comprises a lateral guard wall 61 and a lip 62, wherein the lip 62 is perpendicularly connected to the lateral guard wall 61. The lateral guard wall 61 is a thin, solid piece of material that extends upwards above the grated cover 30 in order to prevent the splash or spray of urine from escaping the confines of the grated cover 30. The lip 62 is positioned into the lateral inner groove 36 and acts to securely anchor the lateral guard wall 61 in an upright position.

The design and shape of the splash guard 60 may vary according to the desired use of the splash guard 60. When the splash guard 60 is intended for use without the bed 70, then the lateral guard wall 61 may form a three-paneled wall, such that the dog can access the permeable sheet 40 and grated cover 30 from one side, while the remaining sides are protected. If the splash guard 60 is intended for use with the bed 70, then the lateral guard wall 61 may form a two-paneled wall. In any design, the spray guard prevents urine from splashing or spraying, while still allowing for the convenient removal of the permeable sheet 40 and the grated cover 30.

The present invention may further comprise a plurality of wheels. Each of the plurality of wheels is connected to the base frame 10. The base frame 10 may further comprise a bottom base panel in order to support the receptacle, as the plurality of wheels act to raise the base frame 10 above the ground. Alternatively, the plurality of wheels may be designed such that each of the plurality of wheels is adjustable in height, wherein the plurality of wheels can be lowered to engage the ground in order to move the present invention, and then raised to disengage the ground when the present invention is in place. The plurality of wheels can be track wheels, castors, etc. Additionally, each of the plurality of wheels may comprise a locking mechanism in order to prevent the plurality of wheels from rotating, and thus anchor the present invention in one position.

The present invention may further comprise an antimicrobial coating for sanitation purposes. The antimicrobial coating is applied to the base frame 10, the receptacle 20, the grated cover 30, and the permeable sheet 40. Additional packages of the antimicrobial coating may be provided in order to reapply the antimicrobial coating to the various components as needed.

The present invention may be utilized by a dog for defecation as well as for urination. As with dog defecation outdoors, the owner may remove the dog waste from the surface of the waste receptacle 20.

Figure 16:
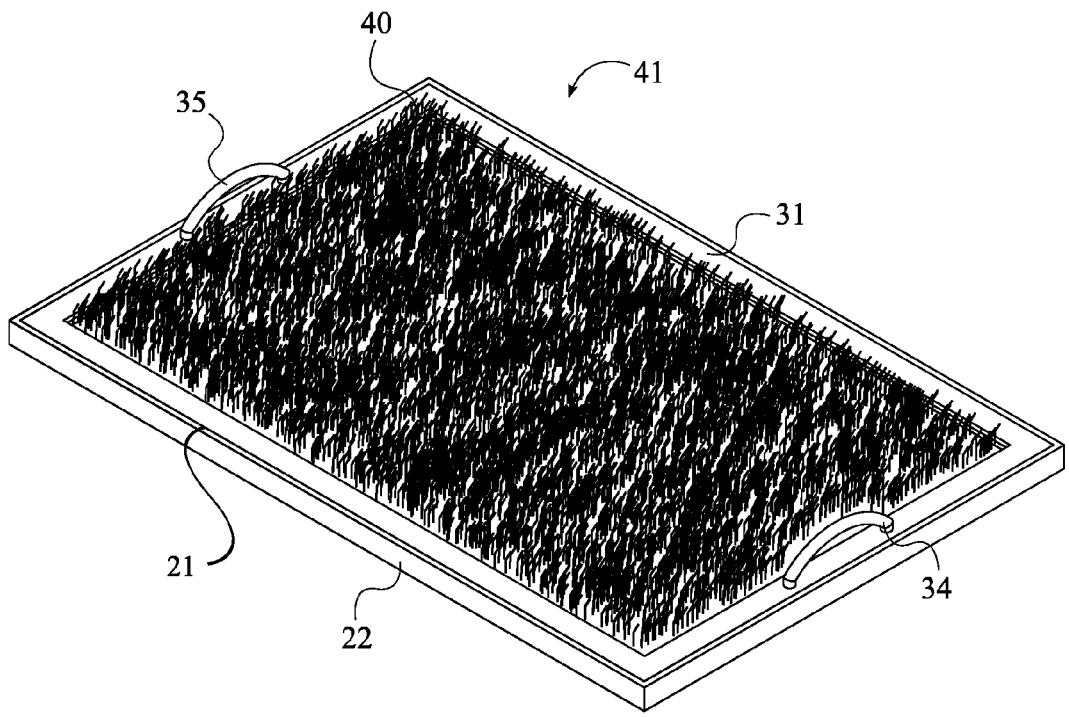
FIG. 16 is a perspective view of the grated cover positioned directly into the receiving volume of the receptacle.

In the most basic form of the present invention, the receptacle 20, the grated cover 30, and the permeable sheet 40 can be used in conjunction with one another without the base frame 10. In reference to FIG. 16, the grated cover 30 is positioned directly into the receiving volume 23 of the receptacle 20, wherein the first cover handle 34 and the second cover handle 35 are positioned on the lateral cover wall 31 opposite the bottom panel 21 of the receptacle 20. Similarly, the lateral inner groove 36 is positioned adjacent to the cover panel 32 opposite the bottom panel 21, such that the permeable sheet 40 is positioned on top of the grated cover 30. The receptacle 20 can then be placed in a dog crate or used as a standalone waste receptacle.

The present invention allows for the method of training a puppy as hereinafter described. Additionally, the pet training apparatus and waste receptacle 20 is hereinafter referred to as "the Trainer". It is important to first acclimate the puppy to the Trainer, such that the puppy is comfortable and does not associate the present invention with a stressful environment. With the enclosure 50 attached to the base frame 10, toss a few treats into the back of the Trainer leaving the door 54 open. If the puppy is hesitant to enter the Trainer, then feed the puppy its meal next to the Trainer until the puppy is no longer hesitant. Once the puppy is comfortable eating next to the Trainer, the next step is to place the meal just inside of the door 54. Again, once the puppy is comfortable, the meal can be placed progressively further and further back, for example halfway into the Trainer and then all the way into the back of the Trainer. When the puppy is comfortable with entering the Trainer and has progressed to the back, then the door 54 can be closed while the puppy eats. After waiting a couple of minutes upon completion of the meal, the door 54 can be opened to let out the puppy. If the puppy is immediately comfortable with entering the Trainer, then a toy can be tossed into the back of the Trainer and the door 54 can be closed, allowing the puppy to relax for a short period of time, such as five minutes. The amount of time the puppy spends within the Trainer can then be progressively increased until the puppy is comfortable staying in the Trainer for an extended period of time, such as an hour.

Once the puppy is comfortable with the Trainer, the puppy can be trained to associate going to the bathroom with the Trainer. For about the first month of training or until the puppy is about three months old, the ferry service method can be used to in order for the puppy to associate going to the bathroom with the Trainer. When training with the ferry service method, the door 54 of the lateral enclosure wall 51 is closed, while the top enclosure wall 55 is left open. When it is observed that the puppy appears to need to go to the bathroom, then owner simply picks up the puppy and transports the puppy to the Trainer. The owner then places the puppy into the Trainer through the top and allows the puppy to urinate or defecate within the Trainer. Once the puppy is has relieved itself, the puppy can be picked up through the top of the Trainer or the door 54 can simply be opened in order to allow the puppy to exit. At night the puppy can be left in the Trainer with the door 54 closed and the bed 70 inserted. The puppy can then use the portion of the permeable sheet 40 that is not covered by the bed 70 for going to the bathroom if necessary.

Once the owner is confident that the puppy is consistently using the Trainer to go to the bathroom, then the puppy can be transitioned in three different ways. The Trainer can be left inside a residence with the enclosure 50 removed, the Trainer can be placed outside on a patio or balcony with the enclosure 50 removed, or the puppy can be taught to go outside without the Trainer.

When training the puppy to go to the bathroom with the Trainer in the residence, an alternate bed should be placed outside of the Trainer. At the night, the door 54 to the Trainer should be left open in order to allow access for the puppy. Once the puppy is comfortable with sleeping on the alternate bed, then the enclosure 50 and the bed 70 can be removed from the Trainer. The Trainer should then be left in an area that is readily accessible by the puppy.

When training the puppy to go to the bathroom outside using the Trainer, then the following steps are used in continuation of training the puppy to go to the bathroom inside. Once the enclosure 50 and the bed 70 have been removed from the Trainer, then the Trainer can slowly be moved closer to the exit door that the puppy will need to use to go outside. This can be done over the course of a few days or weeks depending on the situation. Once the Trainer is close to the exit door, the Trainer can be moved outside. The puppy should then be taken outside somewhat regularly to accustom the puppy to the outside location. When the puppy is indoors, the owner should then pay attention for signs that the puppy needs to go outside. A bell training method, as later described, can also be used to alert the owner that the puppy needs to go outside.

For training the puppy to go to the bathroom outside without the use of the Trainer, once the puppy is consistently using the Trainer, then the owner can start to bring the puppy outside. As the puppy begins to use the Trainer less and less, the owner should begin to limit access to the Trainer. An alternate bed can be placed elsewhere in the residence for the puppy to rest on. At night the door 54 to the Trainer should be left open to allow the puppy access to the Trainer. When it is observed that the puppy is no longer using the Trainer at night, the Trainer can be removed completely when the owner is comfortable.

The bell training method can be used in order to train the puppy to alert the owner that the puppy needs to go outside. A bell or multiple bells are hung or otherwise positioned next to the exit door that the puppy will use. Each time the puppy is let outside to use the bathroom, the owner brings the puppy to the bell and allows the puppy to sniff the bell. The owner then rings the bell and can use a command as well if desired. The owner then gives praise to the puppy and takes the puppy outside. Over time the puppy will associate ringing the bell with going outside to use the bathroom and will begin to ring the bell as needed.

Although the invention has been explained in relation to its preferred embodiment, it is to be understood that many other possible modifications and variations can be made without departing from the spirit and scope of the invention as hereinafter claimed.

What is claimed is:

1. A dog waste receptacle comprising:
a receptacle;
a grated cover; and
a permeable sheet;
the receptacle comprising a bottom panel, a lateral receptacle wall and a receiving volume;
the grated cover comprising a lateral cover wall, a cover panel, and a plurality of openings and a lateral inner groove;
the permeable sheet comprising a sheet body and a plurality of synthetic fibers;
the bottom panel being positioned within the lateral receptacle wall;
the lateral receptacle wall being perimetrically connected to the bottom panel;
the receiving volume being delineated by the lateral receptacle wall and the bottom panel;
the cover panel being positioned within the lateral cover wall;
the lateral cover wall being perimetrically connected to the cover panel;
the plurality of openings traversing through the cover panel;
the grated cover being positioned above the receiving volume;
the permeable sheet being positioned onto the grated cover;
the plurality of synthetic fibers being formed on the sheet body;
the sheet body being located in between the plurality of openings and the plurality of synthetic fibers;
the lateral inner groove traversing into the lateral cover wall;
the lateral inner groove being positioned adjacent to the cover panel;
the cover panel being located in between the lateral inner groove and the bottom panel;
the sheet body comprising a plurality of edges;
at least one of the plurality of edges being inserted into the lateral inner groove;
a bed; and the bed being located above the plurality of synthetic fibers.

2. The dog waste receptacle as claimed in claim 1 comprising:
the grated cover further comprising a first cover handle and a second cover handle;
the first cover handle and the second cover handle being adjacently connected to the lateral cover wall;
the first cover handle and the second cover handle being positioned opposite each other along the lateral cover wall;
the first cover handle and the second cover handle being positioned on the lateral cover wall; and
the lateral cover wall being located in between the bottom panel and the first and second cover handles.

3. The dog waste receptacle as claimed in claim 1 comprising:
the bed being positioned onto the plurality of synthetic fibers.

4. The dog waste receptacle as claimed in claim 1 comprising:
a splash guard;
the cover panel being located in between the splash guard and the bottom panel;
the splash guard comprising a lateral guard wall and a lip;
the lip being perpendicularly connected to the lateral guard wall;
the lip being inserted into the lateral inner groove; and
the plurality of edges being located in between the lip and the cover panel.

5. The dog waste receptacle as claimed in claim 1 comprising:
the bed being attached to the lateral cover wall.

6. A dog waste receptacle comprising:
a base frame;
a receptacle;
a grated cover; and
a permeable sheet;
the base frame comprising a lateral base wall, a base opening; and a plurality of cross members;
the receptacle comprising a bottom panel, a lateral receptacle wall and a receiving volume;
the grated cover comprising a lateral cover wall, a cover panel, and a plurality of openings and a lateral inner groove;
the permeable sheet comprising a sheet body and a plurality of synthetic fibers;
the plurality of cross members being adjacently connected to the lateral base wall;
the plurality of cross members being positioned within the lateral base wall;
the bottom panel being positioned within the lateral receptacle wall;
the lateral receptacle wall being perimetrically connected to the bottom panel;
the receiving volume being delineated by the lateral receptacle wall and the bottom panel;
the cover panel being positioned within the lateral cover wall;
the lateral cover wall being perimetrically connected to the cover panel;
the plurality of openings traversing through the cover panel;
the grated cover being positioned within the lateral base wall;
the grated cover being positioned onto the plurality of cross members;
the plurality of openings being positioned adjacent to the plurality of cross members;
the permeable sheet being positioned onto the grated cover;
the plurality of synthetic fibers being formed on the sheet body;
the sheet body being located in between the plurality of openings and the plurality of synthetic fibers;
the lateral inner groove traversing into the lateral cover wall;
the lateral inner groove being positioned adjacent to the cover panel;
the cover panel being located in between the lateral inner groove and the plurality of cross members;
the sheet body comprising a plurality of edges;
at least one of the plurality of edges being inserted into the lateral inner groove;
the receptacle being positioned within the lateral base wall;
the receptacle being positioned adjacent to the plurality of cross members;
the plurality of cross members being located in between the receptacle and the grated cover;
the base opening traversing through the lateral base wall;
the base opening being positioned adjacent to the receptacle;
a bed; and
the bed being located above the plurality of synthetic fibers.

7. The dog waste receptacle as claimed in claim 6 comprising:
an enclosure;
the enclosure comprising a lateral enclosure wall and a top enclosure wall;
the lateral enclosure wall being attached to the lateral base wall;
the grated cover being located in between the lateral enclosure and the receptacle;
the lateral enclosure wall being positioned around the plurality of cross members; and
the top enclosure wall being hingedly connected to the lateral enclosure wall opposite the lateral base wall.

8. The dog waste receptacle as claimed in claim 7 comprising:
the base frame further comprising a plurality of holes;
the lateral enclosure wall comprising a plurality of posts;
the plurality of holes being positioned into the lateral base wall in a direction from the grated cover towards the receptacle;
the plurality of holes being positioned around the plurality of cross members; and
the plurality of posts being positioned into the plurality of holes, wherein the lateral enclosure is attached to the base frame.

9. The dog waste receptacle as claimed in claim 7 comprising:
the lateral enclosure wall comprising an enclosure opening and a door; and
the door being positioned adjacent to the enclosure opening.

10. The dog waste receptacle as claimed in claim 6 comprising:
the receptacle further comprising a receptacle handle;
the receptacle handle being adjacently connected to the lateral receptacle wall; and
the receptacle handle being positioned adjacent to the base opening.

11. The dog waste receptacle as claimed in claim 6 comprising:
the grated cover further comprising a first cover handle and a second cover handle;
the first cover handle and the second cover handle being adjacently connected to the lateral cover wall;
the first cover handle and the second cover handle being positioned opposite each other along the lateral cover wall;
the first cover handle and the second cover handle being positioned on the lateral cover wall; and
the lateral cover wall being located in between the plurality of cross members and the first and second cover handles.

12. The dog waste receptacle as claimed in claim 6 comprising:
the bed being positioned onto the plurality of synthetic fibers.

13. The dog waste receptacle as claimed in claim 6 comprising:
a splash guard;
the cover panel being located in between the splash guard and the plurality of cross members;
the splash guard comprising a lateral guard wall and a lip;
the lip being perpendicularly connected to the lateral guard wall;
the lip being inserted into the lateral inner groove; and
the plurality of edges being located in between the lip and the cover panel.

14. The dog waste receptacle as claimed in claim 6 comprising:
the bed being attached to the lateral cover wall.

15. A dog waste receptacle comprising:
a base frame;
a receptacle;
a grated cover;
an enclosure;
a permeable sheet; and
a splash guard;
the base frame comprising a lateral base wall, a base opening and a plurality of cross members;
the receptacle comprising a bottom panel, a lateral receptacle wall, a receiving volume and a receptacle handle;
the grated cover comprising a lateral cover wall, a cover panel, a plurality of openings, a lateral inner groove, a first cover handle and a second cover handle;
the enclosure comprising a lateral enclosure wall and a top enclosure wall;
the lateral enclosure wall comprising an enclosure opening and a door;
the permeable sheet comprising a sheet body and a plurality of synthetic fibers;
the cover panel being located in between the splash guard and the plurality of cross members;
the splash guard comprising a lateral guard wall and a lip;
the plurality of cross members being adjacently connected to the lateral base wall;
the plurality of cross members being positioned within the lateral base wall;
the bottom panel being positioned within the lateral receptacle wall;
the lateral receptacle wall being perimetrically connected to the bottom panel;
the receiving volume being delineated by the lateral receptacle wall and the bottom panel;
the cover panel being positioned within the lateral cover wall;
the lateral cover wall being perimetrically connected to the cover panel;
the plurality of openings traversing through the cover panel;
the grated cover being positioned within the lateral base wall;
the grated cover being positioned onto the plurality of cross members;
the plurality of openings being positioned adjacent to the plurality of cross members;
the first cover handle and the second cover handle being adjacently connected to the lateral cover wall;
the first cover handle and the second cover handle being positioned opposite each other along the lateral cover wall;
the first cover handle and the second cover handle being positioned on the lateral cover wall;
the lateral cover wall being located in between the plurality of cross members and the first and second cover handles;
the lateral inner groove being positioned into the lateral cover wall;
the lateral inner groove being positioned adjacent to the cover panel opposite the plurality of cross members;
the permeable sheet being positioned onto the grated cover;
the sheet body comprising a plurality of edges;
at least one of the plurality of edges being inserted into the lateral inner groove;
the plurality of synthetic fibers being formed on the sheet body;
the sheet body being located in between the plurality of openings and the plurality of synthetic fibers;
the lip being perpendicularly connected to the lateral guard wall;
the lip being inserted into the lateral inner groove;
the plurality of edges being located in between the lip and the cover panel;
the receptacle being positioned within the lateral base wall;
the receptacle being positioned adjacent to the plurality of cross members;
the plurality of cross members being located in between the receptacle and the grated cover;
the base opening traversing through the lateral base wall;
the base opening being positioned adjacent to the receptacle;
the receptacle handle being adjacently connected to the lateral receptacle wall;
the receptacle handle being positioned adjacent to the base opening;
the lateral enclosure wall being attached to the lateral base wall;
the grated cover being located in between the lateral enclosure and the receptacle;
the lateral enclosure wall being positioned around the plurality of cross members;
the top enclosure wall being hingedly connected to the lateral enclosure wall opposite the lateral base wall;
the door being positioned adjacent to the enclosure opening;
a bed; and
the bed being located above the plurality of synthetic fibers.

16. The dog waste receptacle as claimed in claim 15 comprising:
the base frame further comprising a plurality of holes;

the lateral enclosure wall further comprising a plurality of posts;
the plurality of holes being positioned into the lateral base wall in a direction from the grated cover towards the receptacle;
the plurality of holes being positioned around the plurality of cross members; and
the plurality of posts being positioned into the plurality of holes, wherein the lateral enclosure is attached to the base frame.

17. The dog waste receptacle as claimed in claim 15 comprising:
the bed being positioned onto the plurality of synthetic fibers.

18. The dog waste receptacle as claimed in claim 15 comprising:
the bed being attached to the lateral cover wall.

19. The dog waste receptacle as claimed in claim 15 comprising:
the bed being attached to the lateral enclosure wall.

* * * * *